Figure 1:
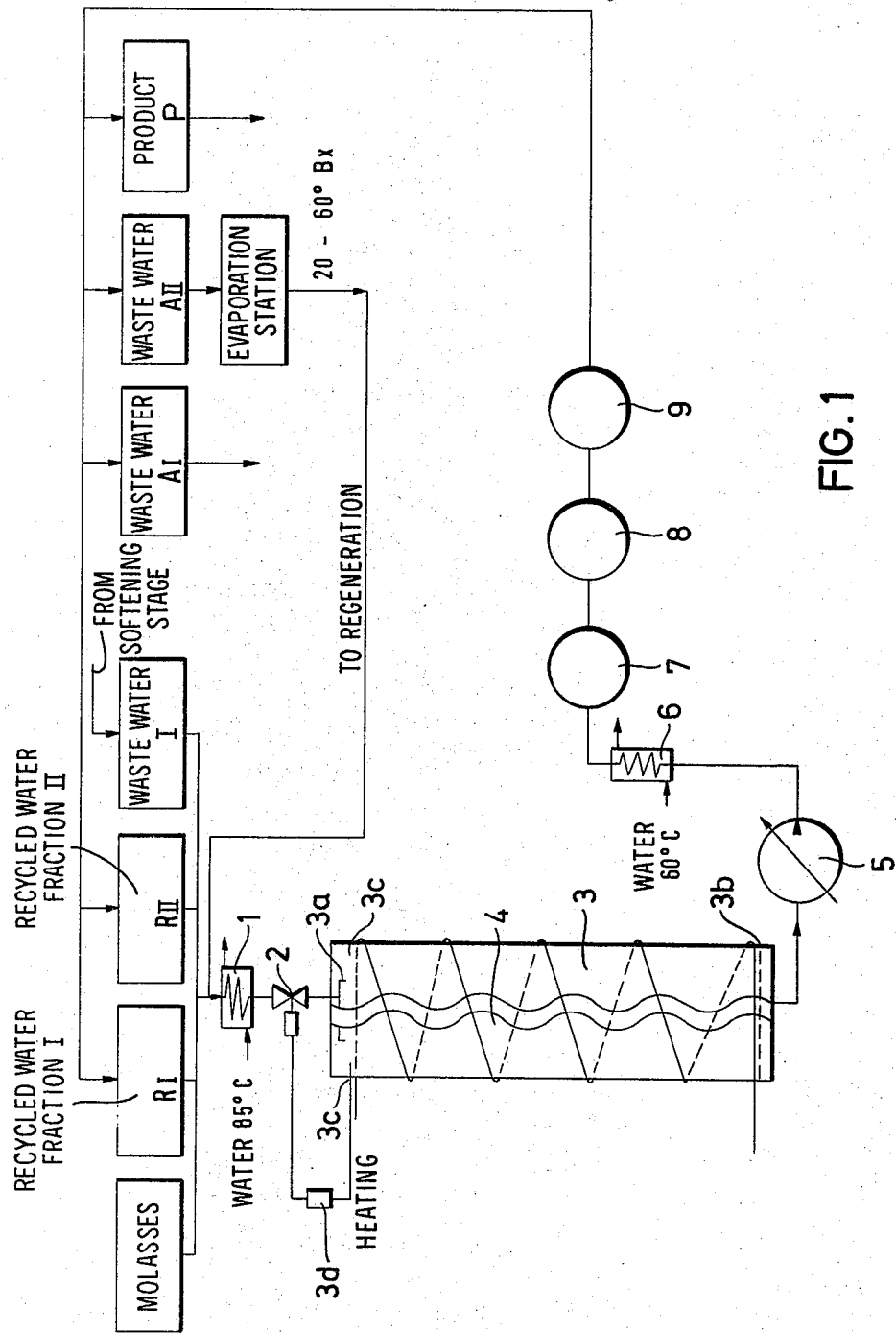

United States Patent [19]

Schneider et al.

[11] 3,884,714

[45] May 20, 1975

[54] PROCESS FOR MAKING SUGAR FROM MOLASSES BY ION REMOVAL

[75] Inventors: Hans-Georg Schneider; Jiri Mikule, both of Euskirchen, Germany

[73] Assignee: Pfeiffer and Langen, Cologne, Germany

[22] Filed: July 9, 1973

[21] Appl. No.: 377,227

[52] U.S. Cl. ............... 127/46 B; 127/46 A; 210/30; 210/34
[51] Int. Cl. ............................................. C13d 3/14
[58] Field of Search ............. 127/46 A, 46 R, 46 B; 210/30, 34

[56] References Cited
UNITED STATES PATENTS

| | | | |
|---|---|---|---|
| 2,771,193 | 11/1956 | Simpson | 210/31 R |
| 2,868,677 | 1/1959 | Kopke | 127/46 B |
| 2,937,959 | 5/1960 | Reents | 127/46 R |
| 3,214,293 | 10/1965 | Mountfort | 127/46 B X |
| 3,591,415 | 7/1971 | Zievers | 210/34 |
| 3,791,866 | 2/1974 | Kunin | 210/30 |

Primary Examiner—Morris O. Wolk
Assistant Examiner—Sidney Marantz
Attorney, Agent, or Firm—Edmond T. Patnaude

[57] ABSTRACT

In a process for extracting sugar from molasses, mechanically purified molasses is passed across the surface of an ion exclusion resin, the resin is then eluted with a sugar solution and water, and the elute is taken off in a number of fractions with the more pure and concentrated fractions being used for elution of the resin. The least pure fraction, i.e. the fraction of highest ionic content, is concentrated to provide a regeneration solution for the ion exclusion resin.

13 Claims, 6 Drawing Figures

PROCESS FOR MAKING SUGAR FROM MOLASSES BY ION REMOVAL

Molasses is obtained as the residual product in the production of sugar and on the average contains 50% sugar, 23% water, 19% organic non-sugar substances, and about 8% inorganic constituents which remains as ash on the burning of molasses. It is of great economic importance to utilize the high surar content of molasses for the extraction of sucrose. In the Steffen process, this is achieved by precipitating the sucrose with CaO. However, the processing of the resulting tricalcium saccharate suspension entails considerable technical outlay and is therefore not very economical. The same applies to the baryta process.

A process is known for extracting by the ion exclusion method the sugar contained in run-off syrups obtained in cane sugar refining, known as refiner's syrup.

This known process is based on the observation that some ion exchange resins have under conditions of equilibrium a substantially different absorption capacity for highly ionised compounds than for non-ionised molecules, such as sugar molecules.

If refiner's syrup is brought into contact with an ion exchange resin which selectively absorb the non-ionic sugar molecules, while the organic and inorganic ionised impurities are selectively excluded, during subsequent dilution with water the ionic components will pass out of the column first and be collected as a separate fraction, which is followed by the pure sugar solution which can be collected in another fraction.

Particularly large molecules, for example various dyes, behave similarly to the ionised components. Like the sugar molecules, these are not ionised or are only slightly ionised, but because of their size, they cannot penetrate into the exchange resin. Such substances are therefore excluded in the same way as the ions from the sugar solution and are collected in the first fraction.

When the ion exclusion method is applied to the recovery of sugar from sugar solutions, the calcium and magnesium ions contained in the refiner's syrup are, however, largely removed before the application of the ion exclusion method, since they disturb the controlled performance of the process.

These disturbing alkaline earth ions contained in the refiner's syrup are removed either by precipitation with suitable salts, such as for example phosphates, or by base exchange on a cation exchange resin. If the precipitation method is applied, an excess of precipitants is necessary, and this excess must subsequently be separated again during the ion exclusion process. Quantitative removal of the alkaline earths is not possible in this manner.

Partial removal of the alkaline earth ions is also possible by ion exchange. Because of the high total ion concentration, this removal is generally effected countercurrently. In the known process, however, the exhausted ion exchange resin must be regenerated with large amounts of sodium chloride, which entails considerable expense.

The sodium chloride contained in the regenerating solution must then be recovered at heavy cost. Otherwise the regeneration waste water is heavily contaminated by large amounts of sodium chloride.

The known ion exclusion method for the desurgarisation of refiner's syrup also has the disadvantage that the ion exclusion resin, which after a certain time becomes charged with calcium and magnesium ions and loses its activity, must be regenerated with an approximately 10% sodium chloride solution. Large amounts of sodium chloride are necessary for this purpose. Thus, for example, the amount of sodium chloride which is required to regenerate an ion exclusion column of a height of 12 meters and a diameter of 4 meters is about 15 metric tons. Apart from the cost entailed by the relatively pure sodium chloride required for this purpose, the difficulty occurs in this process that the sodium chloride is dissolved in the effluent after the regeneration. It can be partly recovered from the effluent, thereby entailing technical and economic outlay. If the entire amount of sodium chloride is discharged in the effluent, the latter will be highly charged with ions, thus contributing towards environment pollution.

For these reasons, but also because of the high total ion content of molasses and particularly because of the high content of alkaline earth ions together with a high proportion of other impurities, specialists were prejudiced against the ion exclusion method and believed that economic extraction of sugar from molasses was not possible by this means.

A simple method has now surprisingly been discovered for the extraction of sugar from molasses, which enables molasses, which have been subjected only to mechanical purification, to be desurgarised by the ion exclusion method and which enables the exhausted ion exclusion resins to be regenerated with an effluent obtained as waste product in the production of sugar.

According to FIG. 1, the installation for carrying out the method of the invention consists essentially of a heat exchanger 1, a solenoid valve 2, and a column 3, which is filled with ion exclusion resin and provided with a distributor ring 3a, a sieve bottom 3b, and two vertically adjustable electrodes 3c which operate the solenoid valve 2 with the aid of an electrical relay 3d and control admission into the column in such a manner that the level of liquid is kept about 1 cm above the resin.

The column may be of any technically convenient size, while any ratio of diameter to height may be used, this ratio generally amounting to between 1 and 0.05. The column is made of the materials generally used for this purpose, particularly of high-grade steel. It may be provided with a compressible body 4 which is anchored on the sieve bottom 3d and elastically absorbs the swelling and shrinking of the ion exclusion resin in the course of the process, thereby preventing the resin from jamming in the exchange tube, as described in U.S. patent application Mikule et. al. application Ser. No. 307,102 filed Nov. 16, 1972. This body 4 may consist of a soft rubber hose which is pulled through the column from top to bottom, is joined to an equalising vessel disposed above the column, and is filled with water.

The ion exclusion resin used may be a commercially available cation exchange resin containing sulpho groups in the monovalent salt form, cross-linked with 4 – 5% divinylbensene (for example Dowex 50 W–X4). Preferably an ion exclusion resin is used of which more than 90% has a grain size of over 0.315 mm (mesh size). The best results are obtained with a resin of the following grain size distribution: 1 – 0.8mm — traces; 0.8 – 0.63mm — 1%; 0.63 – 0.5mm — 10.8%; 0.5 – 0.4mm — 61.2%; 0.4 – 0.315mm — 24.1%; smaller than 0.315mm — 2.5%. The amount of liquid withdrawn from the column must, however, in no circumstances be greater than the amount which would freely flow out of the column without using a pump. There are also provided a heat exchanger 6 ensuring a constant temperature and also one measuring cell for the recording conductometer 7, one for the polarimeter 8, and one for the reflectometer 9. There is also provided a distributor system for the various fractions of the solution, this system being described below.

Figure 2:
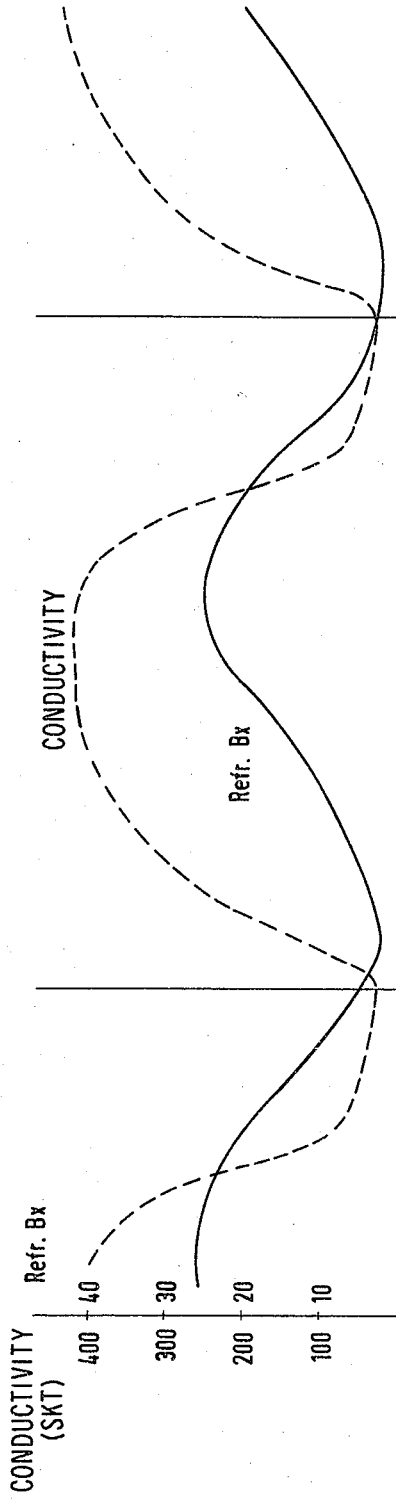

Before commencement of the ion exclusion process, the ion exclusion resin is brought to the required temperature of about 85°C by rinsing with hot water. At the beginning of the process, about 0.08 bed volume (B.V.) of molasses of 40° – 60° Bx are introduced into the uncharged, that is to say desugarised column. Sufficient water is then added to the column to obtain a total volume, including that of the molasses previously introduced, of 0.64 bed volume. The run-off of the column is divided into fractions. The sweet water fraction amounting to about 0.7 bed volume appears first. It consists of practically pure water and it is further used for desugarising the column or diluting the molasses. The following fractions correspond qualitatively to those also obtained in the subsequent cycles and are described with reference to FIG. 2. These consist of:

| | Abbreviations in FIG. 2 | B.V. |
|---|---|---|
| Waste Water I | AI | 0.10 |
| Waste water II | AII | 0.18 |
| Recycled fraction I | RI | 0.18 |
| Product | P | 0.08 |
| Recycled fraction II | RII | 0.10 | and are defined more fully below:
(Here °Bx = °Brix = % dry substance
quotient = sucrose/dry substance
ash = ash determined by conductometer

| | |
|---|---|
| Waste water I (= AI): | waste water with low sugar content |
| | Bx  3 – 4 |
| | Quotient  0 – 10 |
| | % ash/100 Bx  25 – 35 |
| | pH  5.8 – 6.2 |
| Waste water II (= AII): | waste water with high sugar content |
| | Bx  5 – 11 |
| | Quotient  35 – 48 |
| | % ash/100 Bx  23 – 26 |
| | pH  6.2 – 6.6 |
| Recycled fraction I (=RI): | Overlapping fraction between the waste water and product fractions; this composition is close to that of the molasses introduced, but is more dilute. |
| Product (= P): | Bx  15 – 25 |
| | Quotient  84 – 91 |
| | % ash/100 Bx  1 – 4 |
| | pH  8.0 – 9.5 |
| Recycled fraction II (= RII) | Overlapping fraction between the product and waste water fractions. |

In continuous operation, the column is charged for example with 0.04 B.V. molasses of 40° – 60° Bx. Directly after the molasses, the recycled fractions I and II are introduced. Both recycled fractions are taken from the column in the preceding cycle and, depending on the equilibrium of the column, pumped back to the latter with a longer or shorter time lag. After the recycled fraction II, 0.32 B.V., water is for example added to the column. Thereupon, the next cycle begins again by the addition of molasses.

Figure 3:
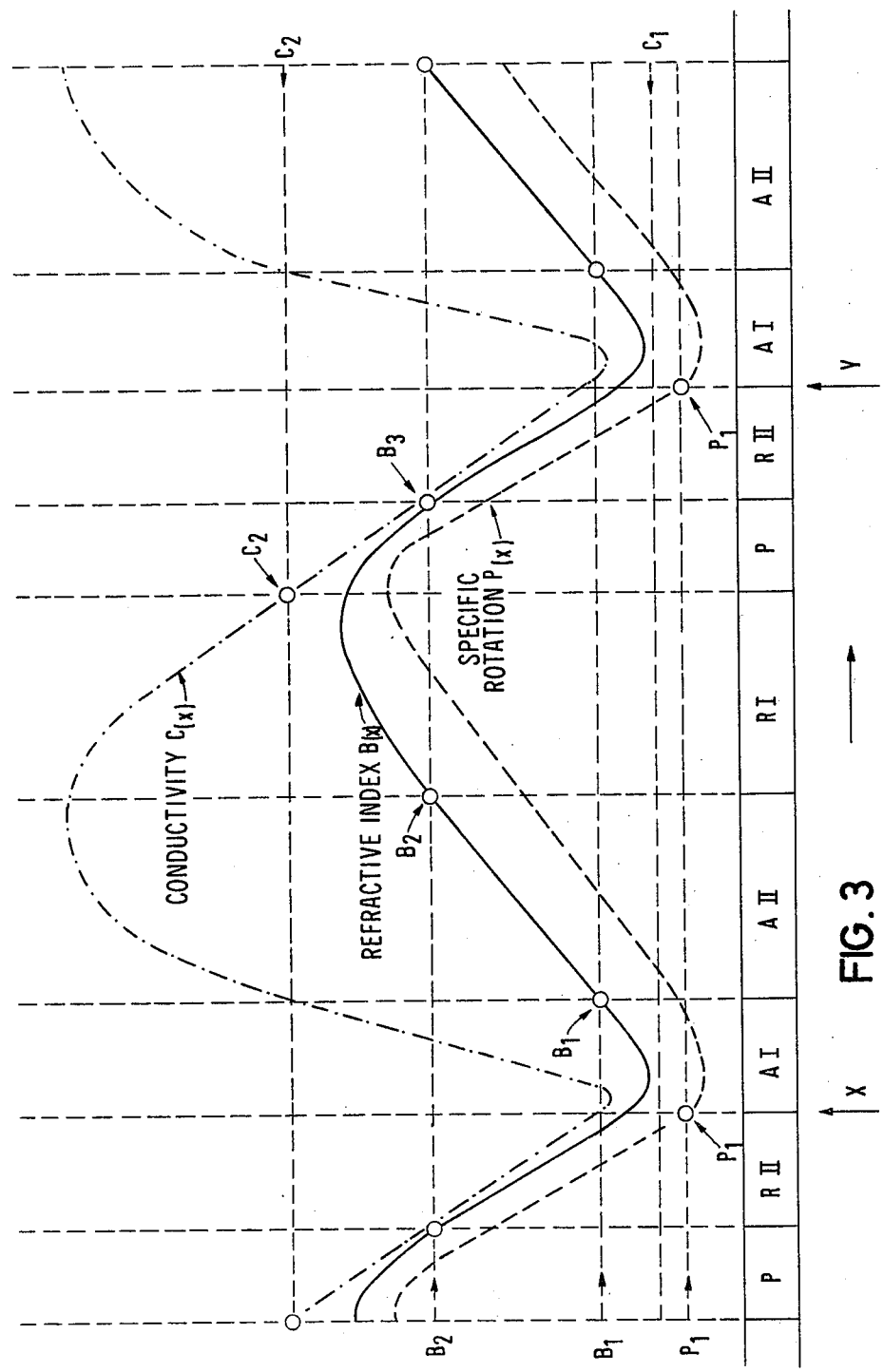

The quantities of the various fractions indicated above constitute only approximate values. Optimum operation is possible only if the fractions are continuously analysed and collected in accordance with their compositions. For this purpose, use is made of the measuring cells shown in FIG. 1 for the recording conductometer 7, which measures the conductivity corresponding to the ash content, for the polarimeter 8 which measures the specific rotation and consequently, the sucrose content expressed in g/l, and for the refractometer 9 which measures the refractive index and consequently the total dry substance in °Brix. FIG. 3 shows the values of the column run-off obtained in this way for a complete cycle. The change points for the classification of the individual fractions can also be seen therefrom. The following abbreviations are used:

$P_1$: the change point, determined by measuring polarisation, between recycled fraction II and waste water I.

$B_1$: the change point, determined by the refractive index, between the waste water I and waste water II fractions.

$B_2$: the change point, determined by the refractive index, between the waste water II and the recycled fraction I.

$C_2$: the change point, determined by conductivity, between the recycled fraction I and the product fraction.

$B_3$: the change point, determined by the refractive index, between the product fraction and the recycled fraction II.

There are thus obtained the following definitions for the individual fractions:

| | |
|---|---|
| Commencement A I: | conductivity$>C_1$ Polarisation$<P_1$ Bx $< B_1$ |
| End of A I: | Bx $= B_1$ |
| Commencement A II: | conductivity$>C_2$ Polarisation$>P_1$ Bx $> B_1$ |
| End of A II: | Bx $= B_2$ |
| Commencement R I: | conductivity$>C_2$ Polarisation$>P_1$ Bx $> B_2$ |
| End of R I: | conductivity $= C_2$ |
| Commencement P: | conductivity$<C_2$ Polarisation$>P_1$ Bx $> B_2$ |
| End of P: | Bx $= B_3$ |
| Commencement R II: | conductivity$<C_2$ Polarisation$>P_1$ Bx $< B_3$ |
| End of R II: | Polarisation $=P_1$ |
| Commencement A I: | conductivity$>C_1$ Polarisation$<P_1$ Bx $< B_1$ |
| End of A I: | Bx $= B_1$ |

The values for the various points may for example be:
Conductivity:
$C_1 = 1.0 \cdot 10^{-4}$ S/cm
$C_2 = 2.5 \cdot 10^{-4}$ S/cm
Specific rotation: $P_1 = 0.2$ g/l referred to the specific rotation (polarisation) of sucrose
Refractive index:
$B_1 = 5°$Bx
$B_2 = 12°$Bx In the process of the invention, it is naturally possible for individual fractions to be further subdivided or else combined. Thus, in particular, the number of recycled fractions may be different, for example higher than in the example described.

The various fractions are used for the following purposes:

the purest fraction, the product, is alkaline and practically free from invert sugar. It is passed on to the sugar extraction stage, in which about 70% of the sugar contained in the product can be extracted in pure form without waste water being produced.

The recycled fractions I and II have sufficient purity and sugar concentrations to enable them to be profitably re-subjected to the ion exclusion resin after the molasses. As compared with the molasses, these recycled fractions are very dilute, and together with the water following them, serve for the elution of the ion exclusion resin, while at the same time, a large proportion of the sugar contained in them is separated by ion exclusion. It is particularly advantageous to pass these recycled fractions over ion exchangers, which remove the disturbing alkaline earth ions, before they are introduced into the ion exclusion column.

The waste water fractions I and II are the fractions of lowest purity and highest ionic content. If there is no further use for the waste water fraction I, which has a low sugar content, it is discarded. Residues obtained from it can be burned. The waste water fraction II, which has a high sugar content, can be concentrated and soaked up, for example, by beet pulp, which thus becomes a valuable cattle fodder. The concentrated waste water fractions are however advantageously used for regenerating the ion exclusion resin.

The ion exclusion resin is in fact, charged with calcium and magnesium ions in the course of the working cycles, whereby it suffers a loss of activity.

Figure 4:
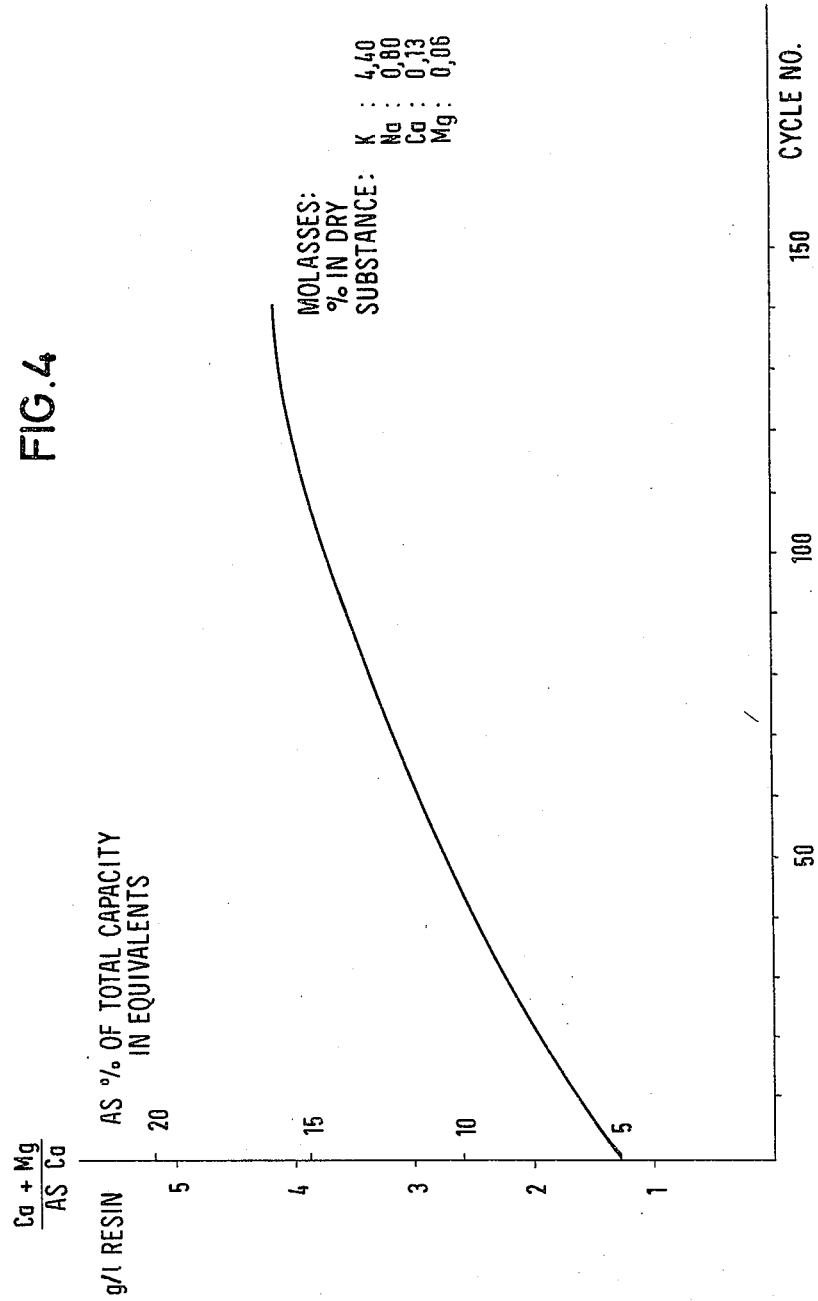
Figure 5:
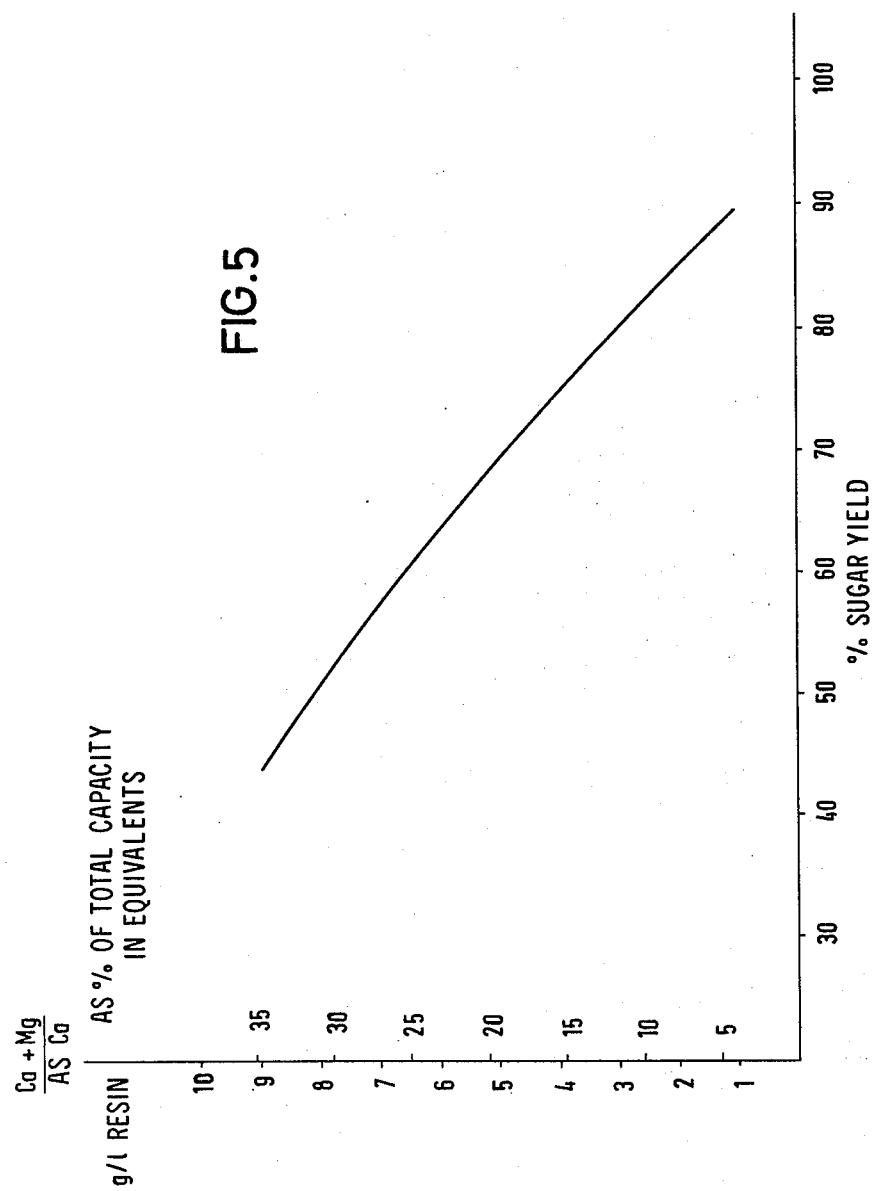
Figure 6:
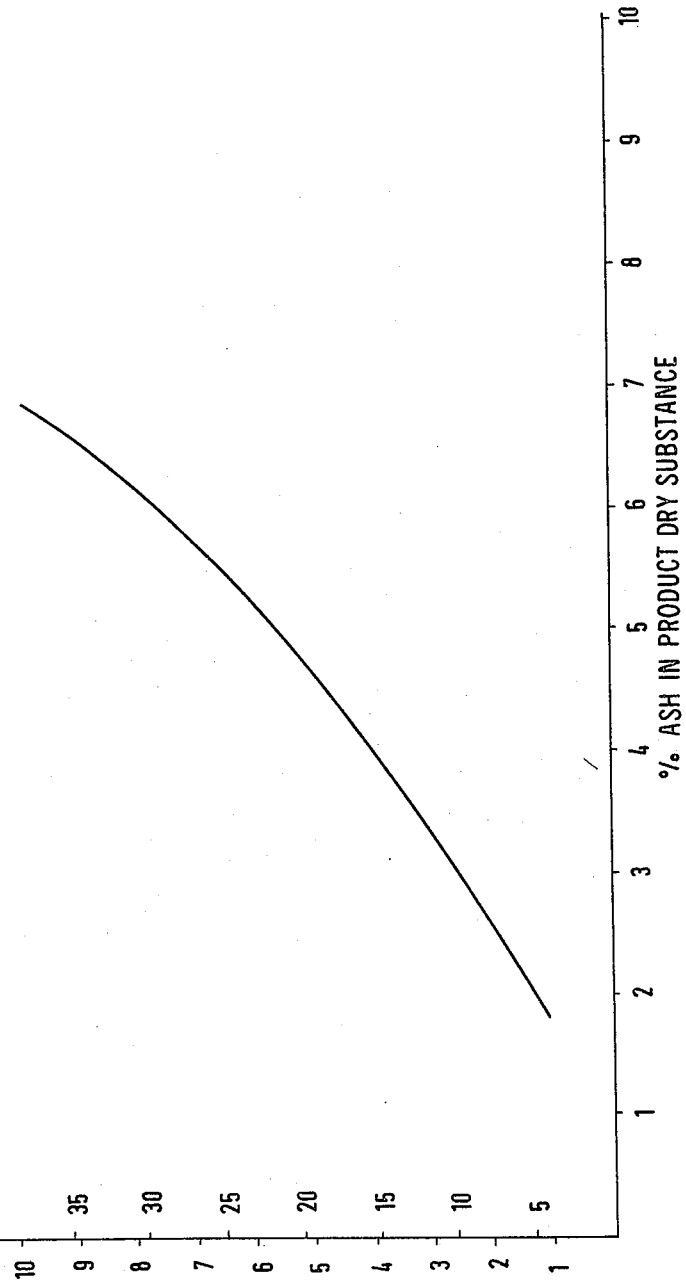

FIG. 4 shows the charging of the ion exclusion resin, which is generally an ordinary commercial cation exchange resin containing sulpho groups in the monovalent salt form and is cross-linked with 4 – 5% divinylbenzene (for example Dowex 50 W–X4) — with calcium and magnesium ions in relation to the number of ion exclusion cycles carried out. FIG. 5 shows the charging of the ion exclusion resin with calcium and magnesium ions in relation to the sugar yield obtained in the ion exclusion process. FIG. 6 shows the charging of the ion exclusion resin with calcium and magnesium ions in relation to the ash content of the product obtained. From FIGS. 5 and 6, it can be seen that the extraction of sugar can be carried out economically only if the ion exclusion resin is charged with calcium and magnesium ions at the most to the extent of 15 – 20% of its total capacity. A resin charged with alkaline earth ions to this extent is regarded as exhausted. From FIG. 4, it can be seen that the resin is exhausted after about 100 – 150 ion exclusion cycles and accordingly, must be regenerated.

The equilibrium charging of an ion exchange resin, and consequently also of the ion exclusion resin used, in the replacement of bivalent ($Ca^{2+}$) by monovalent ($K^+$) ions is illustrated in accordance with the law of mass action by an expression which includes the total concentration of the solution:

$$\left(\frac{X_{Ca^{++}}}{X_K^2}\right)_A = \frac{\kappa \cdot C_A}{C_L}\left(\frac{X_{Ca^{++}}}{X_K^{2+}}\right)_L$$

$X_{Ca^{++}}$ and $X_K^+$ = Fraction of the total concentration in equivalents per volume or unit of weight which is attributable to calcium or potassium.
C = Total concentration in equivalents per volume or unit of weight.
K = Equilibrium constant.
A and L = Refer as indices to the exchanger and to the solution respectively.

(For the sake of simplicity, the calcium and magnesium ion content will be calculated hereinbelow as calcium content). With a constant ratio of potassium to calcium in the solution, the absorption of calcium by the resin is a function of the total concentration $C_L$ in the solution. $C_A$ is the total capacity of the resin, and consequently, a constant factor. The exchanger will therefore preferentially absorb calcium ions from solutions of low concentration, even if the concentration of potassium is a multiple of that of calcium.

With a high total concentration, however, the potassium ions will displace the calcium ions from the exchanger. This process takes place during regeneration. In the ion exclusion of sugar-containing solutions by the method of the invention, the total ion concentration of the solutions passed over the ion exclusion resin is variable.

A sugar solution of 40° – 60° Brix (1° Brix = 1% dry substance), for example molasses, is introduced. Elution is then effected with recycled fractions and finally with pure water. A mean concentration of about 15° Brix is thus adjusted at the outlet of the column, and consequently also a correspondingly lower total concentration $C_L$ in the solution.

A sugar solution of 60° Brix is about 1 normal, referred to the ions, but at 15° Brix it is only 0.2 normal. This dilution is sufficient to influence the equilibrium between the resin and the sugar solution in such a manner that calcium and magnesium are absorbed by the resin.

Although this process is undersirable in the ion exclusion process, it is impossible to avoid it, as has been described with reference to FIG. 4. In accordance with what has been said above, for the purpose of regeneration it is possible to use a solution which has a high total concentration of ions and in addition a high excess of potassium ions in relation to calcium ions. Waste waters such as are obtained in the production of sugar comply with these requirements. This is illustrated in the following examples.

Example 1

Control test: Regeneration of ion exclusion resins with 10% NaCl solution.

Ion exclusion resin was regenerated in known manner at 85°C with 10% sodium chloride solution. The resin had the following content of ions (g/l resin):

|  | K | Na | Ca | Mg |
| --- | --- | --- | --- | --- |
| Resin before regeneration | 32.5 | 4.0 | 2.84 | 0.41 |
| Resin after regeneration with 1 bed volume | 6.5 | 26.3 | 2.70 | 0.16 |
| Resin after regeneration with 2 bed volumes | 0.23 | 30.0 | 1.06 | 0.06 |
| Resin after regeneration with 3 bed volumes | 0.05 | 32.5 | 0.32 | 0.06 |

Example 2

Regeneration of ion exclusion resin with molasses. The molasses is filtered but not softened. It contains the following amounts of ions (in % dry substance):

| K | 4.40 |
| --- | --- |
| Na | 0.80 |
| Ca | 0.13 |
| Mg | 0.06 |

Molasses of 60° Brix at 86°C is introduced in an amount corresponding to 1 bed volume (B.V.) of the ion exclusion column. Analysis of the ion exclusion resin gave the following values (in g/l resin):

|  | K | Na | Ca | Mg |
| --- | --- | --- | --- | --- |
| Resin before regeneration | 35.0 | 5.0 | 5.60 | 0.29 |
| Resin after regeneration | 42.5 | 5.5 | 0.75 | 0.09 |

This type of regeneration is used in cases where only part of the molasses obtained is desugarised, while the other part can be used for other purposes. For these other purposes a higher alkaline earth content is not disturbing, so that after use as regenerating liquid the molasses can still be used for the required purpose.

Example 3

Regeneration of the ion exclusion resin with a waste water from the ion exclusion process, containing 60% dry substance.

Waste water obtained in the ion exclusion process is concentrated by evaporation to 60% dry substance and has the following content (in % dry substance):

| | |
|---|---|
| K | 7.24 |
| Na | 1.51 |
| Ca | 0.14 |
| Mg | 0.01 |

Regeneration was effected at 85°C with various amounts of waste water, which are indicated in bed volumes of the ion exclusion column. The resin was charged with the following amounts of ions (in g/l resin):

| | K | Na | Ca | Mg |
|---|---|---|---|---|
| Resin before regeneration | 35.0 | 4.5 | 6.80 | 0.19 |
| Resin after regeneration with 0.25 B.V. | 40.0 | 5.6 | 4.22 | 0.18 |
| Resin after regeneration with 0.50 B.V. | 45.0 | 6.7 | 0.78 | 0.07 |
| Resin after regeneration with 0.75 B.V. | 47.0 | 6.7 | 0.42 | 0.09 |
| Resin after regeneration with 1.0 B.V. | 46.0 | 6.8 | 0.42 | 0.08 |
| Resin after regeneration with 1.50 B.V. | 45.0 | 6.5 | 0.22 | 0.06 |
| Resin after regeneration with 2.0 B.V. | 45.0 | 6.5 | 0.19 | 0.06 |

As can be seen from these values, the regeneration with the waste water used is substantially more effective than regeneration with sodium chloride. Thus, the calcium content of a resin before regeneration amounts to 6.8%, while after regeneration according to the invention with 2 bed volumes it has fallen to 0.19%. On the other hand, the calcium content falls only from 2.84% to 0.32% in the case of regeneration with sodium chloride solutions.

Example 4

Regeneration of ion exclusion resins with waste waters of the ion exclusion process which contain 25% dry substance, at 85°C.

The waste water used for regeneration had the following composition (in % dry substance):

| | |
|---|---|
| K | 7.07 |
| Na | 0.98 |
| Ca | 0.19 |
| Mg | 0.07 |

The ion exclusion resin had the following content of ions (in g/l resin):

| | K | Na | Ca | Mg |
|---|---|---|---|---|
| Resin before regeneration | 32.5 | 4.0 | 2.84 | 0.41 |
| Resin after regeneration with 1 B.V. | 35.0 | 5.0 | 1.89m | 0.36 |
| Resin after regenerataion with 2 B.V. | 35.0 | 5.0 | 0.85 | 0.27 |
| Resin after regeneration with 3 B.V. | 37.5 | 5.0 | 0.77 | 0.23 |

Example 5

Regeneration of ion exclusion resin by waste water which was obtained in the ion exclusion process and from which part of the calcium and magnesium ions have been precipitated.

The calcium and magnesium content of the waste water can be reduced by precipitation with suitable salts, such as carbonates and phosphates. Waste water of 25° Brix was brought to a pH of 8.5 with a soda solution, thus precipitating part of the alkaline earth ions in the form of a sludge, which was filtered off from the solution. The untreated waste water had the following ion content (in % dry substance):

| | |
|---|---|
| K | 7.07 |
| Na | 0.98 |
| Ca | 0.19 |
| Mg | 0.07 |

The waste water treated with soda solution had the following content (in % dry substance):

| | |
|---|---|
| K | 4.94 |
| Na | 1.49 |
| Ca | 0.08 |
| Mg | 0.04 |

In the ion exclusion resin the following ion concentrations (in g/l resin) were found:

| | K | Na | Ca | Mg |
|---|---|---|---|---|
| Resin before regeneration | 32.5 | 4.0 | 2.84 | 0.41 |
| After regeneration with 1 B.V. | 30.0 | 8.0 | 1.35 | 0.27 |
| After regeneration with 2 B.V. | 30.0 | 8.2 | 1.08 | 0.15 |
| After regeneration with 3 B.V. | 30.0 | 8.3 | 0.63 | 0.13 |
| After regeneration with 4 B.V. | 30.0 | 8.3 | 0.36 | 0.13 |
| After regeneration with 5 B.V. | 30.0 | 8.5 | 0.22 | 0.07 |

Ion exclusion resins for the desugarisation of sugar-containing solutions are slightly cross-linked, highly swellable gel exchangers with sulpho groups. In contact with solutions of high osmotic pressure, these resins contract considerably. Thus the bed of a resin of this kind shrinks for example by 13–15% when it is regenerated with a 10% sodium chloride solution at 85°C. Such intensive shrinking during regeneration, together with the correspondingly intensive swelling occurring during subsequent elution, would lead to clogging of the column and make further flow through the latter impossible. In addition, in the course of time the resin would be splintered by the continuous mechanical stress if suitable steps were not taken, for example the transfer of the resin to open vessels or the like for the purpose of regeneration, to counteract the effects of the swelling and shrinking.

In the case of regeneration with sugar-containing waste water the ion exclusion resin also shrinks and swells. It has, however, been found that the shrinking of the resin amounts to only 9% when it is regenerated with waste water of 25° – 30° Brix by the method of the invention. The method of the invention therefore permits regeneration in situ, while avoiding the disturbances described.

As mentioned in Example 5, it is advantageous for the waste water used for the regeneration to be subjected before use to a precipitation process in which part of the calcium and magnesium ions are precipitated. Suitable salts for the precipitation are in particular phosphates, such as for example superphosphate or trisodium phosphates, or carbonates, such as soda and the like. If magnesium ions are present in large amounts, it is advantageous to effect the precipitation with phosphoric acid and ammonia, so that the magnesium is precipitated as ammonium-magnesium phosphate.

The ash obtained from waste products from the production of sugar is particularly suitable for precipitating the alkaline earth ions from the waste waters used for the regeneration of ion exclusion resins. Thus, for example, in the ion exclusion process a fraction is obtained which contains practically no sugar but has a higher content of ions. This can be concentrated, dried, and finally burned. The resulting ash is inexpensive and excellently suited for this purpose.

Suitable solutions for the regeneration of ion exclusion resins are all solutions obtained in the production of sugar which contain sugar and have a potassium content amounting to between 4 and 8.0% in dry substance, if the solutions contain from 10 to 70%, preferably from 25 to 40% dry substance, and also molasses containing 30 – 70%, preferably 50–65% dry substance.

If part of the disturbing alkaline earth ions are removed by an ion exchange resin from the molasses before desugarisation by the ion exclusion process, this ion exchange resin can also be regenerated with the above-mentioned sugar-containing solutions having a high content of potassium ions, particularly with concentrated waste waters from sugar production.

This regeneration takes place in accordance with the same principles, and in accordance with a very similar process, as the regeneration of the ion exclusion resin. It is explained more fully with the aid of Example 6 below.

Example 6

Molasses of 25° Brix with a content of 0.12% Ca + Mg, calculated as Ca in dry substance, was passed through a column containing cation exchange resin with sulpho groups in the monovalent salt form, which had been cross-linked to the extent of 8 – 10% with divinylbenzene, for example Lewatit Sp 120 of Bayer AG, until the exchange resin was charged with 2.10 g/l Ca + Mg, expressed as Ca. The regeneration was carried out at 80°C from top to bottom with a concentrated waste water fraction of 60°Bx, which was obtained in the ion exclusion process and had the following ion content (rate of outflow 4 bed volumes per hour):

K — 5.85 % in dry substance
Na — 1.46 % in dry substance
Ca — 0.12 % in dry substance
Mg — 0.04 % in dry substance The resin had the following content of Ca + Mg ions, expressed as Ca in g/l resin:

Table 1

| | |
|---|---|
| before regeneration: | 2.10 |
| after regeneration with 1 bed volume : | 0.99 |
| after regeneration with 2 bed volumes : | 0.62 |
| after regeneration with 3 bed volumes : | 0.58 |

With the resin regenerated in this manner, calcium and magnesium ions were exchanged from molasses. For this purpose 20 bed volumes of molasses of 25°Bx were passed through the column, likewise from top to bottom. The molasses used contained 0.23% Ca + Mg, expressed as Ca in dry substance. After desugarisation the molasses run-off had the following alkaline earth content (expressed in % Ca in dry substance):

Table 2

| | |
|---|---|
| Average bed volumes 1 to 5 | 0.04 |
| Average bed volumes 6 to 10 | 0.08 |
| Average bed volumes 11 to 15 | 0.15 |
| Average bed volumes 16 to 20 | 0.22 |

From the above values it can be seen that despite the parallel flow (in the regeneration and in the softening of the molasses) an average of more than 60% Ca + Mg, expressed as Ca, was removed from the molasses of the first 15 bed volumes. It is to be expected that with parallel flow operation a greater hardening effect can be achieved. As a control test, an ion exchange resin, Lewatit Sp 120, which was charged with 2.10 g of Ca + Mg, expressed as Ca, per litre of resin by passing molasses through it, was regenerated with sodium chloride. A 10% NaCl solution was passed over the charged exchange resin at 80°C. The rate of outflow amounted to 4 bed volumes per hour. The content of Ca + Mg in the resin, expressed in g Ca/l resin, can be seen from the following table:

Table 3

| | |
|---|---|
| Before regeneration | 2.10 |
| After regeneration with 1 bed volume | 1.83 |
| After regeneration with 2 bed volumes | 1.56 |
| After regeneration with 3 bed volumes | 1.25 |
| After regeneration with 4 bed volumes | 0.85 |
| After regeneration with 5 bed volumes | 0.68 |

From this it can be seen that the regeneration of the ion exchange resin with sugar-containing waste water having a high potassium content, such as is obtained as waste water from sugar production by the ion exclusion process, is substantially more effective than regeneration with a sodium chloride solution.

The exchange resin was in fact not even regenerated as well with 5 bed volumes of 10% sodium chloride solution as with 2 bed volumes of waste water. If, in addition, it is taken into account that the content of monovalent cations in the 10% sodium chloride solution amounts to 1.85 val/l, and is thus 11% higher than the content of the waste water which contains 1.66 val potassium + sodium ions, the better action of the process according to the invention becomes still clearer.

Both ion exchangers which soften the molasses before the desugarisation process, and those which soften certain recycled fractions of the molasses desugarisation process, can be regenerated by this method.

Example

The mechanically purified molasses was collected in a molasses vessel and at a given time was passed to the exclusion column by means of a quantity counter with quantity preselection and with the aid of a centrifugal pump and a heat exchanger, in which it was heated to 85°C. After introduction of the preselected amount of molasses, the valve under the molasses container was automatically closed and the outlet of the container for recycled fraction I (R I), where liquid from the previous cycle had collected, was opened.

Like the molasses, the recycled fraction I (R I) was supplied to the exclusion column by way of the heat exchanger with the aid of the centrifugal pump.

After the emptying of the R I container, the outlet valve of this container was automatically closed and the outlet valve of the container for recycled fraction II (R II) was opened. The recycled fraction II (R II), which had collected in this container from the previous cycle, was supplied to the exclusion column by way of the heat exchanger with the aid of the centrifugal pump, like the molasses and recycled fraction I (R I).

After the emptying of the R II container the outlet valve of this container was automatically closed, so that the R II container and also the R I container were ready to receive further R I and R II.

After the closing of the outlet valve of the recycled fraction II container, the outlet valve of the condensate container was automatically opened and with the aid of a quantity counter with quantity preselection the desired amount of water was passed to the column by the same route as was taken by the molasses, R I and R II previously.

In the condensate container the condensed vapours from the concentration of the exclusion product and of the by-products were collected.

After introduction of the preselected amount of condensate the valve under the condensate container was automatically closed and the outlet of the molasses container opened, and the cycle described above was repeated.

The exclusion column used in this example is in the form of a pressure vessel, in order to enable the liquid to be forced through the resin bed at an elevated pressure of 1 - 2 atmospheres gauge. The desired air pressure in the head of the column is controlled with the aid of an air control station.

The exclusion resin column with a height of 7 metres and a diameter of 3 metres rests on a sieve bottom on which a layer of gravel is laid. The resin is subjected to heavy fluctuations of volume during charging. Consequently, the level of the resin also fluctuates. Since for the separation it is absolutely necessary that the difference in level between the liquid above the resin bed and the level of the resin should be kept as low as possible and also kept constant, the column is equipped with a device for the constant measuring and control of the level of liquid above the resin bed.

In order to keep heat losses as low as possible, the column was insulated and provided with temperature control.

The desired rate of outflow is kept constant with the aid of a flow regulator. With the aid of the recording conductometer, digital polarimeter, and refractometer, the outgoing liquid was divided semi-automatically, in accordance with its composition, into four fractions, which were passed on for further use, as follows:

by-product fractions (about 5° Bx) to the collecting vessel, the recycled fraction I (R I) to the recycled fraction I vessel, the exclusion product (about 19°Bx) to the collecting vessel, the recycled fraction II (R II) to the recycled fraction II vessel.

After a certin time the resin must be thoroughly back-washed in order to remove mechanical impurities. This was done in a back-washing vessel. The resin was run off from the column into this vessel, air was bubbled through the mixture of resin and water, and, after the resin had settled, the back-washing water was pumped off from above. On completion of this operation the mixture of resin and fresh water was agitated by introducing air and passed back to the column by means of the resin pump.

The back-washing vessel also serves at the same time as a receiver for resin if the column should need repair.

Most of the time, however, the vessel served as a reservoir for one of the concentrated by-product fractions for regeneration. The regeneration was effected in situ.

After passing through the column, the regeneration run-off followed the route of the other by-product fractions and after concentration to 70° Bx was collected in the storage space for by-products.

With an exclusion plant containing 50 cubic metres exclusion resin, about 5,000 metric tons of white sugar can be obtained by continuous working if the exclusion product, which is very readily crystallised, is processed by the usual crystallisation technique used in sugar production.

| | |
|---|---|
| Processed (beet) molasses 80° Bx | about 15,000 t/a |
| Crystal sugar produced | about 5,000 t/a |
| By-productss, total 70° Bx | about 9,800 t/a |

After finally leaving the exclusion plant the by-products — the fractions of lowest purity — may be used, for example, as a valuable fodder, fertiliser, or as starting product for the preparation of organic substances.

From the exclusion product it is possible to obtain direct, by treatment by ion exchange, a sugar solution which after concentration can be sold as a valuable white invert syrup.

There are obtained:

8,800 t/a invert syrup with 70% dry substance of usual quality, and 7,000 t/a by-products 70° Bx The exclusion product of about 19° Bx and with a purity quotient of about 87 was worked up into crystal sugar after concentration in the usual way in sugar production.

The regeneration was carried out with 2 - 4 bed volumes of a by-product fraction of about 40° Bx every 100 - 300 cycles depending on the cation composition of the molasses processed.

The intake and output of the column both amounted to 32.5 cubic metres per hour. A cycle lasted about 60 minutes.

An average of 2.0 cubic metres of molasses of 60° Bx, 7.5 cubic metres of recycled fraction I, 9.5 cubic metres of recycled fraction II, and 15.5 cubic metres of water were introduced into the column.

An average of 13.0 cubic metres of by-product fractions with an average Brix of 5°, 7.5 cubic metres of recycled fraction I, 4.5 cubic metres of product of about 90° Bx, and 9.5 cubic metres of recycled fraction II were taken out of the column.

With the method of the invention an economical process for the extraction of sugar from molasses, in which chemical adjuvants are scarcely necessary, is made available for the first time to the sugar industry.

The advantages of the method of the invention consist particularly in that the molasses can be subjected direct to the ion exclusion process without necessarily having been freed of alkaline earth ions in a separate stage of the process, so that a considerable proportion of the sugar content of the molasses can be subjected to sugar extraction.

In addition, by means of the process of the invention the ion exclusion resins and also the ion exchange resins can be regenerated in situ, since, in contrast to regeneration with sodium chloride where swelling and shrinking constitute a considerable technical problem, swelling and skringing occur only to a slight extent.

In addition, regeneration waste water charged with high concentration of sodium chloride ions is not formed, since no additional sodium chloride is required for the regeneration of the exhausted ion exclusion resin and of the ion exchange resin, so that a substantial contribution is made towards an unpolluted environment.

Finally, regeneration with the waste water produced in the desugarisation process itself constitutes a considerable saving.

We claim:

1. A process for extracting sugar from impure sugar bearing solution containing ionic impurities including alkaline earth ions comprising the steps of
   passing said solution over an ion exclusion resin so that sugar is adsorbed by said resin and ionic impurities are excluded, then
   passing a first sugar containing solution over said resin, then
   passing water over said resin,
   separately collecting the effluent from said resin in a plurality of separate fractions of different ionic impurity content concentrating at least a portion of the fraction of highest ionic content to provide a regeneration solution, and
   regenerating said resin by passing said regeneration solution over said resin.

2. A method according to claim 1, characterised in that the concentrated fractions of highest ionic content contain from 10 to 70%, preferably from 25 to 40% of dry substance.

3. A method according to claim 1, characterised in that the ion exclusion resin is regenerated with molasses containing from 30 to 70%, preferably 50 to 65% of dry substance.

4. A method according to claim 1, characterised in that the concentrated fractions of highest ionic content contain from 30 to 70 weight % dry substance.

5. A method according to claim 1, characterised in that an ion exclusion resin is used of which more than 90% has a grain size of over 0.315mm.

6. A method according to claim 1, characterised in that part of the alkaline earth ions are precipitated from the fractions of highest ionic content by double reaction with alkali metal salts before being used for regenerating the ion exclusion resin.

7. A method according to claim 6, characterised in that the double reaction is effected with the ash of waste products from the sugar extraction.

8. The process of claim 1 wherein the impure sugar bearing solution is mechanically purified molasses.

9. A method according to claim 8, characterised in that a part of the alkaline earth ions is removed from the molasses by passing it over a cation exchanger before being passed to the ion exclusion resin.

10. A process according to claim 1 wherein
    one or more of the collected fractions are passed over said resin for extracting sugar therefrom.

11. A method according to claim 10, characterised in that before the concentrated fractions of highest ionic content are used for regenerating the ion exclusion resin a part of the alkaline earth ions is removed from them by double reaction with alkali metal salts.

12. A method according to claim 11, characterised in that the double reaction is effected with the ash of the waste products from the sugar extraction.

13. A process according to claim 10 comprising the step of
    passing said one or more of the collected fractions over an ion exchange resin to remove alkaline earth ions therefrom before passing said one or more fractions over said ion exclusion resin for extracting sugar therefrom.

* * * * *